United States Patent
Cho

(10) Patent No.: US 10,464,562 B2
(45) Date of Patent: Nov. 5, 2019

(54) SHIFT CONTROL METHOD FOR RAPIDLY ACCELERATING DCT VEHICLE

(71) Applicants: Hyundai Motor Company, Seoul (KR); Kia Motors Corporation, Seoul (KR)

(72) Inventor: Sung Hyun Cho, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 18 days.

(21) Appl. No.: 16/003,593

(22) Filed: Jun. 8, 2018

(65) Prior Publication Data
US 2019/0168762 A1 Jun. 6, 2019

(30) Foreign Application Priority Data
Dec. 4, 2017 (KR) .......................... 10-2017-0165084

(51) Int. Cl.
*B60W 30/18* (2012.01)
*B60W 10/02* (2006.01)
(Continued)

(52) U.S. Cl.
CPC ...... *B60W 30/18027* (2013.01); *B60W 10/02* (2013.01); *B60W 10/06* (2013.01); *B60W 10/11* (2013.01); *B60W 50/0097* (2013.01); *B60W 2050/004* (2013.01); *B60W 2510/0275* (2013.01); *B60W 2510/0638* (2013.01); *B60W 2540/10* (2013.01); *B60W 2710/021* (2013.01);
(Continued)

(58) Field of Classification Search
CPC ...... B60W 10/02; B60W 10/06; B60W 10/11; B60W 10/113; B60W 30/18; B60W 30/18027; B60W 50/0097; B60W 2540/10
See application file for complete search history.

(56) References Cited

U.S. PATENT DOCUMENTS

| | | | | |
|---|---|---|---|---|
| 4,680,959 A | * | 7/1987 | Henry ................. | G01M 15/044 703/8 |
| 2002/0183162 A1 | * | 12/2002 | Ogawa ................. | B60W 10/02 477/70 |

(Continued)

FOREIGN PATENT DOCUMENTS

| | | |
|---|---|---|
| JP | 4972566 B2 | 7/2012 |
| JP | 5496056 B2 | 5/2014 |

(Continued)

*Primary Examiner* — Edwin A Young
(74) *Attorney, Agent, or Firm* — Morgan, Lewis & Bockius LLP

(57) ABSTRACT

A shift control method for a rapidly accelerating DCT vehicle, may include determining, by a controller, whether or not there occurs a power-on upshift situation in which an accelerator pedal is depressed 50% or more; estimating, by the controller, a predicted time remaining until an engine speed enters a red zone when engagement of a target shift-stage gear is completed under the power-on upshift situation; and performing, by the controller, a torque phase by updating a predetermined target torque phase time to fall within the predicted time when the predicted time is less than the target torque phase time and controlling a disengaging clutch and an engaging clutch depending on the updated target torque phase time.

6 Claims, 3 Drawing Sheets

(51) Int. Cl.
*B60W 10/06* (2006.01)
*B60W 10/11* (2012.01)
*B60W 50/00* (2006.01)

(52) U.S. Cl.
CPC .............. *B60W 2710/0666* (2013.01); *B60W 2710/1005* (2013.01)

(56) References Cited

U.S. PATENT DOCUMENTS

| | | | |
|---|---|---|---|
| 2011/0130931 A1* | 6/2011 | Yoshikawa | F16H 61/0213 701/55 |
| 2012/0232764 A1* | 9/2012 | Inagawa | F02D 29/02 701/54 |
| 2016/0138468 A1* | 5/2016 | Shibata | F02B 77/08 701/110 |

FOREIGN PATENT DOCUMENTS

| | | |
|---|---|---|
| KR | 10-2008-0028151 A | 3/2008 |
| KR | 10-2011-0109022 A | 10/2011 |

* cited by examiner

SHIFT CONTROL METHOD FOR RAPIDLY ACCELERATING DCT VEHICLE

CROSS-REFERENCE TO RELATED APPLICATION

The present application claims priority to Korean Patent Application No. 10-2017-0165084, filed on Dec. 4, 2017 in the Korean Intellectual Property Office, the entire contents of which is incorporated herein for all purposes by this reference.

BACKGROUND OF THE INVENTION

Field of the Invention

The present invention relates to a shift control method for a rapidly accelerating dual-clutch-transmission (DCT) vehicle, and more particularly, to a technology related to a shift control method for the situation in which there is a risk of an engine speed entering a so-called red zone due to rapid acceleration.

Description of Related Art

In a vehicle provided with a DCT, an engine torque is transferred to drive wheels via gear shifting by two clutches. The two clutches are connected to respective input shafts within the DCT so as to realize shift stages assigned to the respective input shafts. The shift stages assigned to the two input shafts are generally divided into odd-numbered stages and even-numbered stages such that any one input shaft may realize only odd-numbered stages and the other input shaft may realize only even-numbered stages.

Meanwhile, in order to prevent damage due to engine overrun, there is designated a red zone, which is an area in which the number of revolutions per minute of an engine provided in the vehicle is equal to or greater than an allowable operation value. Engine overrun may occur when shifting of a transmission is delayed in a High Tip-In (HTI) situation in which a driver depresses an accelerator pedal 50% or more. The occurrence of engine overrun deteriorates engine durability and causes a rapid reduction in engine output due to engine protection logic. Thus, efficient shifting may be difficult, and it may be impossible to satisfy the driver's acceleration request because the performance of acceleration of the vehicle may not be correctly exerted.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a shift control method for a rapidly accelerating DCT vehicle, which may prevent engine overrun via rapid shifting in a response to the driver's rapid acceleration request, and consequently provide engine protection and maximize vehicle acceleration performance to satisfy the driver's request.

In accordance with an aspect of the present invention, the above and other objects may be accomplished by the provision of a shift control method for a rapidly accelerating DCT vehicle, may include determining, by a controller, whether or not there occurs a power-on upshift situation in which an accelerator pedal is depressed 50% or more, estimating, by the controller, a predicted time remaining until an engine speed enters a red zone when engagement of a target gear is completed under the power-on upshift situation, and performing, by the controller, a torque phase by updating a predetermined target torque phase time to fall within the predicted time when the predicted time is less than the target torque phase time and controlling a disengaging clutch and an engaging clutch depending on the updated target torque phase time.

The method may further include performing an inertia phase to reduce an engine torque and synchronize the engine speed with a target shift-stage input shaft speed to complete shifting when the performing is completed.

In the estimating, the predicted time may be estimated using an engine angular acceleration, a current engine speed, and a red-zone lower-limit speed.

In the estimating, a time taken until the current engine speed may increase by the current engine angular acceleration and may reach a margin consideration speed, which is lower than the red-zone lower-limit speed by a predetermined margin range, is determined as the predicted time.

The controller may update the target torque phase time to a value obtained by subtracting a predetermined margin time from the predicted time in the performing.

In the performing, the controller may be configured to control the disengaging clutch and the engaging clutch using a disengaging clutch torque and an engaging clutch torque determined by an equation:

Disengaging Clutch Torque($t$)=Disengaging Clutch Torque($t-1$)−(Disengaging Clutch Torque($t-1$)−Touch Point Torque)/(Target Torque Phase Time−Elapsed Torque Phase Time)

Engaging Clutch Torque($t$)=Engaging Clutch Torque ($t-1$)+(Target Torque−Engaging Clutch Torque ($t-1$))/(Target Torque Phase Time−Elapsed Torque Phase Time)

(here, target torque=target engine torque+$J_e * dN_e/dt$,
$J_e$: engine rotation inertial moment, and
$N_e$: engine speed).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
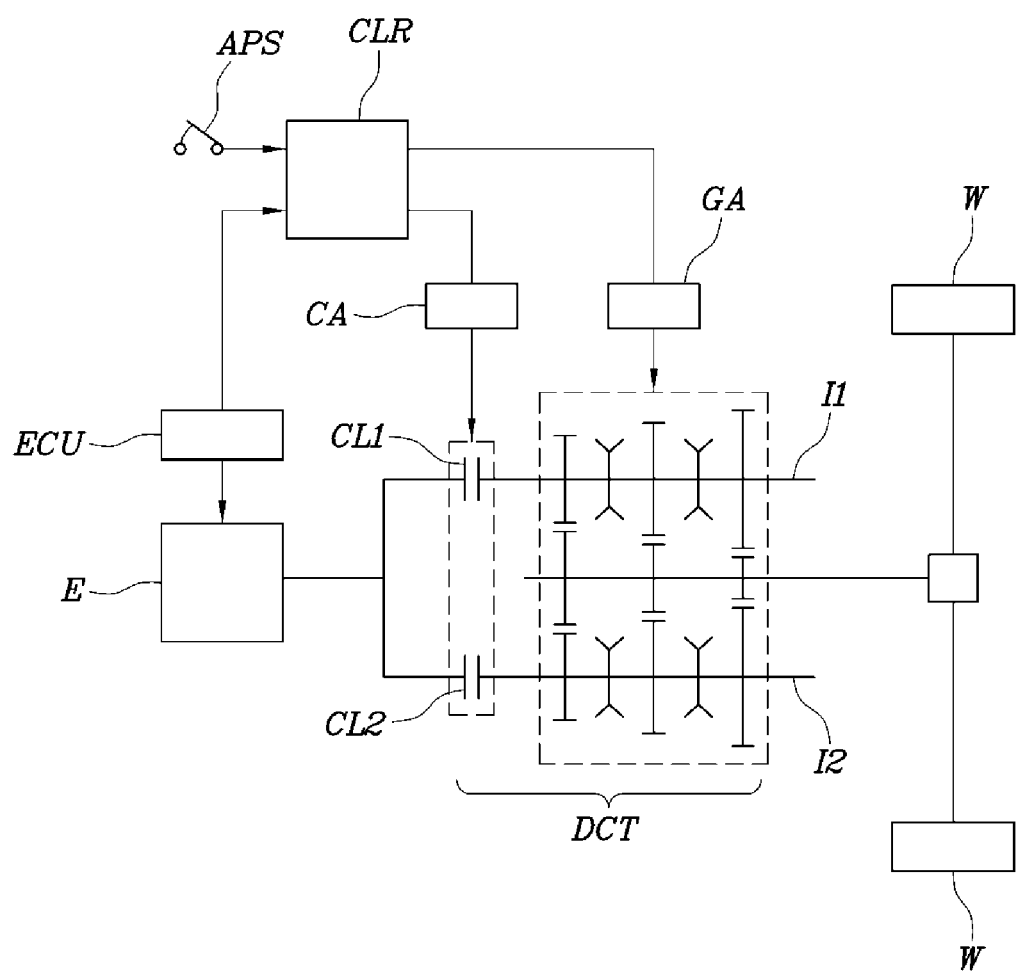
FIG. 1 is a view illustrating the configuration of a DCT vehicle to which the present invention may be applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Referring to FIG. 1, in which the configuration of a DCT vehicle to which the present invention may be applied is illustrated, the power of an engine E is selectively applied to two input shafts I1 and I2 via two clutches CL1 and CL2 of a DCT. After shifting in the DCT, the power is applied to drive wheels W.

A controller CLR is connected to an engine control unit (ECU) to receive information such as an engine torque and request, for example, a reduction in torque to the engine E. The controller CLR is also connected to control a clutch actuator CA, which controls the two clutches CL1 and CL2 of the DCT, and a gear actuator GA, which changes the gear engagement of the DCT.

The controller CLR is configured to receive a signal from an accelerator pedal sensor (APS) and to receive the rotation speed or the like of the respective input shafts I1 and I2 of the DCT.

The two clutches CL1 and CL2 may include one thereof, which realizes a current shift stage, and the other one thereof, which realizes a new target shift stage, upon shifting. In the following description, the clutch that realizes the current shift stage but needs to be disengaged due to the progress of shifting is referred to as a "disengaging clutch", and the clutch which is gradually engaged to realize the target shift stage is referred to as an "engaging clutch".

Furthermore, based on the classification of the clutches described above, the input shaft to which the disengaging clutch is connected is referred to as a "disengaging input shaft", and the input shaft to which the engaging clutch is connected is referred to as an "engaging input shaft".

Furthermore, in the following description, "target shift-stage input shaft speed" means the rotation speed of the input shaft, which is used to realize a target shift stage when a gear of the target shift stage is engaged.

Figure 2:
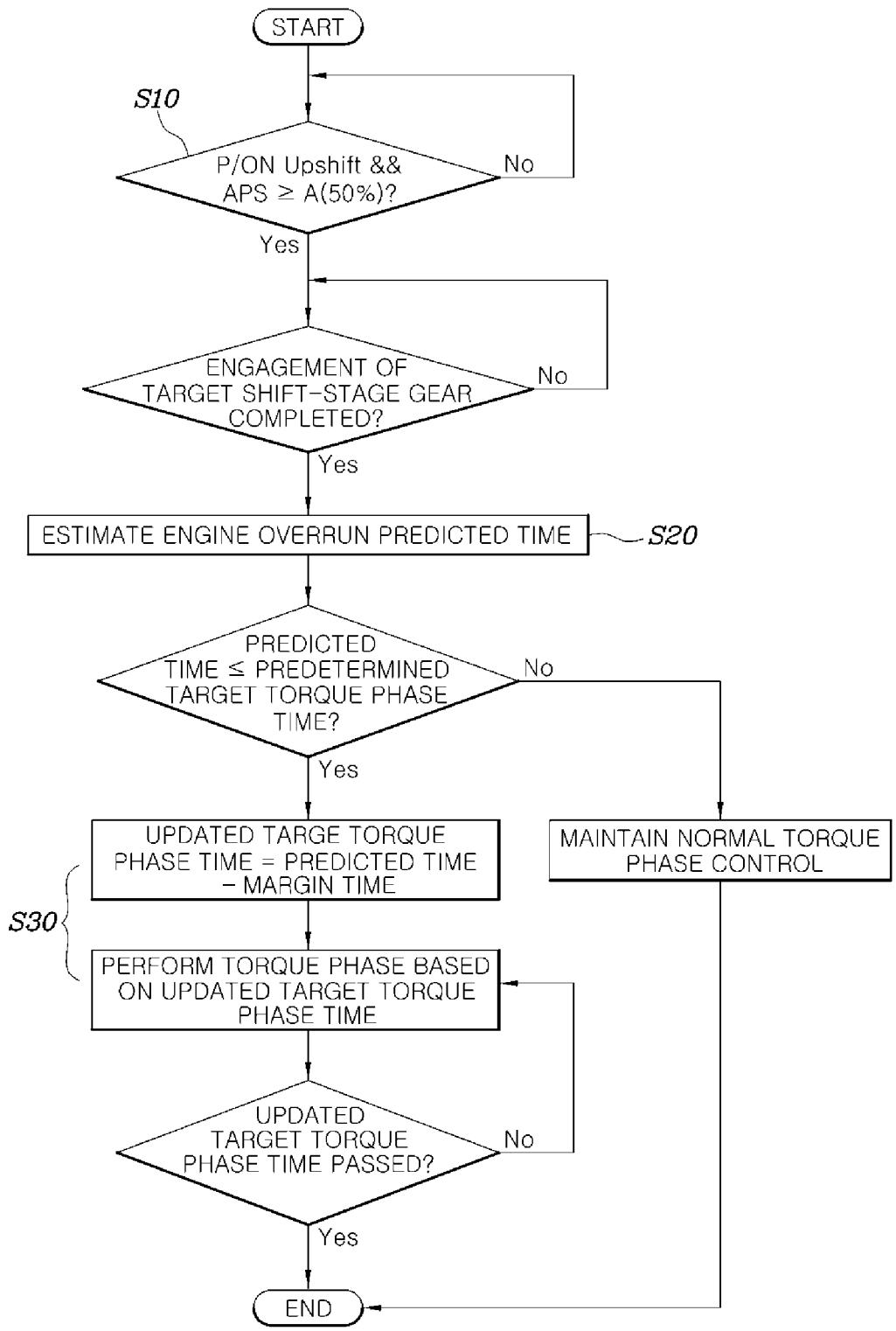
FIG. 2 is a flowchart illustrating an exemplary embodiment of a shift control method for a rapidly accelerating DCT vehicle according to an exemplary embodiment of the present invention.

Referring to FIG. 2, in an exemplary embodiment of the present invention, a shift control method for a rapidly accelerating DCT vehicle may include a shifting situation determination step S10 of determining, by the controller CLR, whether or not there occurs a power-on upshift situation in which an accelerator pedal is depressed 50% or more, an estimation step S20 of estimating, by the controller, a predicted time remaining until an engine speed enters a red zone when the engagement of a target shift-stage gear is completed under the power-on upshift situation, and a torque phase implementation step S30 of performing a torque phase by updating, by the controller, a predetermined target torque phase time to fall within the predicted time when the predicted time is less than the target torque phase time and controlling the disengaging clutch and the engaging clutch depending on the updated target torque phase time.

When the torque phase implementation step S30 is completed, an inertia phase is performed to reduce an engine torque and synchronize the engine speed with a target shift-stage input shaft speed to complete shifting.

That is, in an exemplary embodiment of the present invention, when there is a risk of the engine speed entering the red zone upon implementation of power-on upshifting in which the driver depresses an accelerator pedal 50% or more, a target torque phase time, which is predetermined under the assumption of a general shifting situation, may be reduced so that shifting is performed in a shortened target torque phase time, which may prevent engine overrun.

Figure 3:
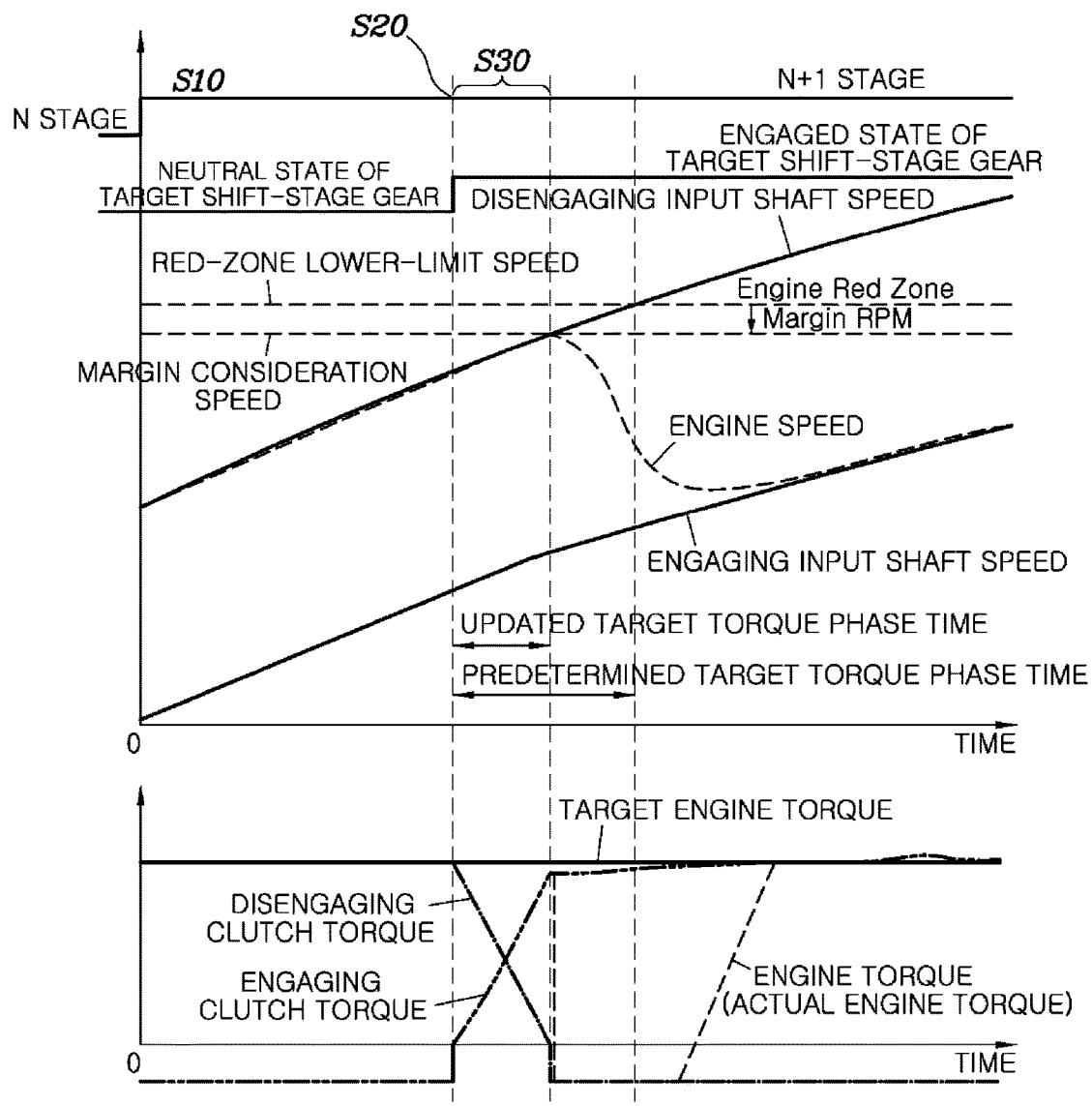
FIG. 3 is a graph explaining an example of performing the shift control method for the rapidly accelerating DCT vehicle according to an exemplary embodiment of the present invention.

FIG. 3 illustrates the case in which upshifting to an N+1 stage is performed during traveling at an N stage. Thus, the target shift stage is the N+1 stage, and the controller performs the estimation step S20 at the time at which the engagement of the N+1 stage gear is completed to determine the predicted time.

In the estimation step S20, the predicted time may be estimated using an engine angular acceleration, a current engine speed, and a red-zone lower-limit speed.

That is, when the current engine speed continuously increases by the current engine angular acceleration, the predicted time may be determined by determining the time taken until the engine speed reaches the red-zone lower-limit speed.

In the example of FIG. 3, to more reliably prevent the engine speed from entering the red zone, the predicted time is determined using a margin consideration speed, which is lower than the red-zone lower-limit speed.

That is, the time taken until the current engine speed increases by the current engine angular acceleration and reaches the margin consideration speed, which is lower than the red-zone lower-limit speed by a predetermined margin range, is determined as the predicted time.

For reference, the margin range may be set to hundreds of RPM so that the time taken until the engine speed reaches the margin consideration speed, which is lower than the red-zone lower-limit speed by hundreds of RPM, is determined as the predicted time.

When a required torque phase time, which will be described below, is shortened using the predicted time determined as described above, it is possible to more stably prevent the engine speed from entering the red zone than in the case of determining the predicted time using the red-zone lower-limit speed.

A "disengaging clutch torque" and an "engaging clutch torque", which are used by the controller for controlling the disengaging clutch and the engaging clutch in the torque phase implementation step S30, may be determined using the following equation:

Disengaging Clutch Torque($t$)=Disengaging Clutch Torque($t$−1)−(Disengaging Clutch Torque($t$−1)−Touch Point Torque)/(Target Torque Phase Time-Elapsed Torque Phase Time)

Engaging Clutch Torque($t$)=Engaging Clutch Torque ($t$−1)+(Target Torque-Engaging Clutch Torque ($t$−1))/(Target Torque Phase Time-Elapsed Torque Phase Time)

Here, target torque=target engine torque+$J_e * dN_e/dt$,
$J_e$: engine rotation inertial moment, and $N_e$: engine speed.

That is, the controller controls the disengaging clutch and the engaging clutch by repeatedly performing a control cycle, and the disengaging clutch torque and the engaging clutch torque to be controlled at a current control cycle t are determined based on the disengaging clutch torque and the engaging clutch torque at a previous control cycle t−1 as described in the above equation, to realize gradual control.

The disengaging clutch torque is obtained by subtracting a value, which is obtained by dividing the difference between the disengaging clutch torque at the previous control cycle and the touch point torque by the time remaining after subtracting the elapsed torque phase time from the target torque phase time, from the disengaging clutch torque at the previous control cycle t−1.

Here, the term "touch point" refers to the point at which the disengaging clutch is switched from the state in which it transmits no torque to the state in which it begins to transmit torque, and the torque at the present point is very close to zero. Therefore, the touch point torque is substantially zero.

Thus, the disengaging clutch torque gradually decreases as time passes, and becomes zero.

For reference, the elapsed torque phase time refers to the time elapsed after the torque phase begins.

The engaging clutch torque is obtained by adding the engaging clutch torque at the previous control cycle t−1 to a value, which is obtained by dividing a value remaining after subtracting the engaging clutch torque at the previous control cycle from the target torque by a value remaining after subtracting the elapsed torque phase time from the target torque phase time.

That is, the engaging clutch torque gradually increases to the target torque.

The target torque is obtained by adding the target engine torque to a value obtained by multiplying variation in engine speed by engine rotation inertial moment.

In the instant case, since variation in engine speed has a positive value when the engine speed continues to increase, the target torque is set to cause the engaging clutch torque to be substantially similar to the target engine torque and to increase the engaging clutch torque as the engine speed rapidly increases, to prevent an excessively rapid increase in engine speed.

Here, the target engine torque is determined by the ECU as the torque that the engine needs to perform normal output in a response to the extent to which the accelerator pedal is depressed by the driver.

Meanwhile, the controller may update the target torque phase time to a value obtained by subtracting a predetermined margin time from the predicted time in the torque phase implementation step S30.

This is to consider the delayed time due to the determination of the controller, the response delay of the clutch actuator, or the like, and the margin time may be set, for example, within the range from 50 ms to 100 ms.

As described above, although deterioration in shift quality may occur when the target torque phase time is updated to fall within the predicted time because engine overrun is predicted, and thus the torque phase progresses more rapidly than in the usual case, the present invention is advantageous compared to the related art because the present invention may prevent engine overrun, may rapidly terminate shifting, and may enable satisfactory vehicle acceleration performance.

When the torque phase implementation step S30 is completed, as described above, the inertia phase is performed to reduce the engine torque and synchronize the engine speed with the target shift-stage input shaft speed. As such, when synchronization is completed, the reduced engine torque is again increased to the target engine torque to complete shifting.

For reference, in the above description, the torque phase refers to a shift section in which the disengaging clutch torque is gradually released and the engaging clutch torque is gradually increased without variation in engine speed, and the inertia phase refers to a shift section in which the engine speed substantially varies and is synchronized with the target shift-stage input shaft speed.

As is apparent from the above description, according to an exemplary embodiment of the present invention, in the case in which a vehicle provided with a DCT has the possibility of engine overrun due to shifting performed in a response to a driver's rapid acceleration request, it is possible to prevent such engine overrun via more rapid shifting, providing engine protection and maximizing vehicle acceleration performance to satisfy the driver's request.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for accelerating a dual-clutch-transmission (DCT) vehicle, the method comprising:
   determining, by a controller, whether there occurs a power-on upshift situation in which an accelerator pedal is depressed 50% or more;
   estimating, by the controller, a predicted time remaining until an engine speed enters a red zone after engagement of a target shift-stage gear is completed under the power-on upshift situation; and
   performing, by the controller, a torque phase to the DCT by updating a predetermined target torque phase time to fall within the predicted time when the predicted time is less than the target torque phase time and controlling a disengaging clutch and an engaging clutch depending on the updated target torque phase time.

2. The method according to claim 1, further including performing an inertia phase to reduce an engine torque and synchronize the engine speed with a target shift-stage input shaft speed to complete shifting after the performing of the torque phase is completed.

3. The method according to claim 1, wherein, in the estimating of the predicted time, the predicted time is estimated using an engine angular acceleration, a current engine speed, and a red-zone lower-limit speed.

4. The method according to claim 3, wherein, in the estimating of the predicted time, a time taken until the current engine speed increases by a current engine angular acceleration and reaches a margin consideration speed, which is lower than the red-zone lower-limit speed by a predetermined margin range, is determined as the predicted time.

5. The method according to claim 1, wherein the controller is configured to update the predetermined target torque phase time to a value obtained by subtracting a predetermined margin time from the predicted time in the performing of the torque phase.

6. The method according to claim 1, wherein, in the performing of the torque phase, the controller is configured to control the disengaging clutch and the engaging clutch using a disengaging clutch torque and an engaging clutch torque determined by an equation:

Disengaging Clutch Torque($t$)=Disengaging Clutch Torque($t$−1)−(Disengaging Clutch Torque($t$−1)−Touch Point Torque)/(Target Torque Phase Time-Elapsed Torque Phase Time)

Engaging Clutch Torque($t$)=Engaging Clutch Torque ($t$−1)+(Target Torque-Engaging Clutch Torque ($t$−1))/(Target Torque Phase Time-Elapsed Torque Phase Time)

wherein, the target torque=target engine torque+Je*dNe/dt,

Je: engine rotation inertial moment, and Ne: engine speed.

* * * * *